US010929169B2

United States Patent
Tarasuk-Levin et al.

(10) Patent No.: US 10,929,169 B2
(45) Date of Patent: Feb. 23, 2021

(54) REPROGRAMMING NETWORK INFRASTRUCTURE IN RESPONSE TO VM MOBILITY

(71) Applicant: VMware, Inc., Palo Alto, CA (US)

(72) Inventors: Gabriel Tarasuk-Levin, San Jose, CA (US); Chi-Hsiang Su, Santa Clara, CA (US); Christoph Klee, Snoqualmie, WA (US); Robert Bosch, Sunnyvale, CA (US)

(73) Assignee: VMware, Inc., Palo Alto, CA (US)

( * ) Notice: Subject to any disclaimer, the term of this patent is extended or adjusted under 35 U.S.C. 154(b) by 114 days.

(21) Appl. No.: 16/256,047

(22) Filed: Jan. 24, 2019

(65) Prior Publication Data
US 2020/0241901 A1    Jul. 30, 2020

(51) Int. Cl.
*G06F 9/455*    (2018.01)
*G06F 9/50*     (2006.01)
*H04L 29/12*    (2006.01)

(52) U.S. Cl.
CPC ...... *G06F 9/45558* (2013.01); *H04L 61/2007* (2013.01); *G06F 9/5077* (2013.01); *G06F 2009/4557* (2013.01); *H04L 61/6018* (2013.01)

(58) Field of Classification Search
CPC .............. G06F 9/45558; G06F 9/5077; G06F 2009/4557; H04L 61/2007; H04L 61/6018
See application file for complete search history.

(56) References Cited

U.S. PATENT DOCUMENTS

| | | |
|---|---|---|
| 9,870,324 B2 | 1/2018 | Mattson, Jr. et al. |
| 2009/0150527 A1 | 6/2009 | Tripathi et al. |
| 2009/0150529 A1 | 6/2009 | Tripathi |
| 2009/0150547 A1 | 6/2009 | Tripathi |
| 2009/0222567 A1 | 9/2009 | Tripathi et al. |
| 2012/0030674 A1 | 2/2012 | Mundkur et al. |
| 2012/0131662 A1 | 5/2012 | Kuik et al. |
| 2012/0185914 A1 | 7/2012 | Delco et al. |
| 2012/0192182 A1* | 7/2012 | Hayward ............... G06F 9/455 718/1 |
| 2013/0031294 A1 | 1/2013 | Feng et al. |
| 2013/0205106 A1 | 8/2013 | Tati et al. |
| 2014/0013324 A1 | 1/2014 | Zhang et al. |
| 2015/0281274 A1 | 10/2015 | Masurekar et al. |
| 2016/0261496 A1 | 9/2016 | Chang |
| 2017/0244673 A1 | 8/2017 | Han |
| 2018/0152417 A1 | 5/2018 | Jain et al. |
| 2018/0212875 A1 | 7/2018 | Zhu |
| 2018/0262396 A1 | 9/2018 | Wang et al. |
| 2019/0007378 A1* | 1/2019 | Jowett ................. H04L 9/3268 |
| 2019/0036868 A1* | 1/2019 | Chandrashekhar ... H04L 45/021 |
| 2020/0034191 A1 | 1/2020 | Tarasuk-Levin et al. |
| 2020/0084179 A1 | 3/2020 | Bansal et al. |

* cited by examiner

*Primary Examiner* — Emerson C Puente
*Assistant Examiner* — Jonathan R Labud
(74) *Attorney, Agent, or Firm* — Patterson + Sheridan, LLP

(57) ABSTRACT

The disclosure provides an approach for dynamically reprogramming network and network infrastructure in response to VM mobility. The approach provides a hypervisor layer that can observe changes in VM-host relationships and reprogram the associated network and network infrastructure to maintain network communication. The hypervisor layer notifies a controller of a data center to migrate an ENI of the migrated VM to the same destination host as the migrated VM, in response to VM migration.

18 Claims, 2 Drawing Sheets

REPROGRAMMING NETWORK INFRASTRUCTURE IN RESPONSE TO VM MOBILITY

RELATED APPLICATIONS

This application is related to U.S. application Ser. No. 16/046,585, filed Jul. 26, 2018, the entire contents of which is hereby incorporated by reference herein.

BACKGROUND

Data centers, such as cloud data centers, have a need to abstract physical constructs, such as network interface cards (NICs). The abstraction of NICs into virtual NICs (vNICs) helps administrators manage network connections without having to directly work with the physical hardware itself. In the cloud data center context, a vNIC is sometimes referred to as an elastic network interface (ENI). An ENI is a software-based virtual network interface that can be implemented within a host. An ENI can function similarly to a network interface card (NIC) in that an ENI may be addressable, such as through an Internet Protocol (IP) address, and may function as a gateway to a host computer or a virtual machine (VM). A host computer may have several ENIs. An ENI may be associated with the physical NIC of a host, and may act in conjunction with the physical NIC. Although this document discusses ENIs, the teachings herein apply equally to any abstraction for managing network interfaces.

Data centers often utilize VMs that run within host computers. Deployment of VMs within hosts allows an efficient use of the host's resources, such as central processing unit (CPU) cycles, memory, etc. An ENI may include security functionality that filters packets in and out of the host computer. The security layer of an ENI works to ensure that misaddressed packets do not enter or exit a host computer.

However, the ENI security layer can create complications when VMs are migrated from host to host. The complication can cause a VM to be unreachable within its host, and cause a VM's packets to be unable to exit or reach the VM or the host.

SUMMARY

Embodiments provide a method of dynamically reprogramming network infrastructure of a data center, the method comprising providing a virtual machine (VM) on a first host; associating the VM with an elastic network interface (ENI) of the first host; migrating the VM from the first host to a second host; connecting the VM to a second hypervisor on the second host; and migrating the ENI from the first host to the second host.

Further embodiments include a non-transitory computer-readable storage medium storing instructions that, when executed by a computer system, cause the computer system to perform the method set forth above, and a computer system programmed to carry out the method set forth above.

BRIEF DESCRIPTION OF THE DRAWINGS

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

The disclosure provides an approach for dynamically modifying or reprogramming network infrastructure in response to VM mobility. The approach includes a hypervisor layer, i.e. a daemon, that listens for modification to VM-host associations and modifies the associated network infrastructure to maintain network communication. The hypervisor layer notifies a controller of a data center to migrate an ENI of the migrated VM to the same destination host as the migrated VM, in response to VM migration. As used herein, the term "network infrastructure" includes components of data center 102 (see FIG. 1).

Figure 1:
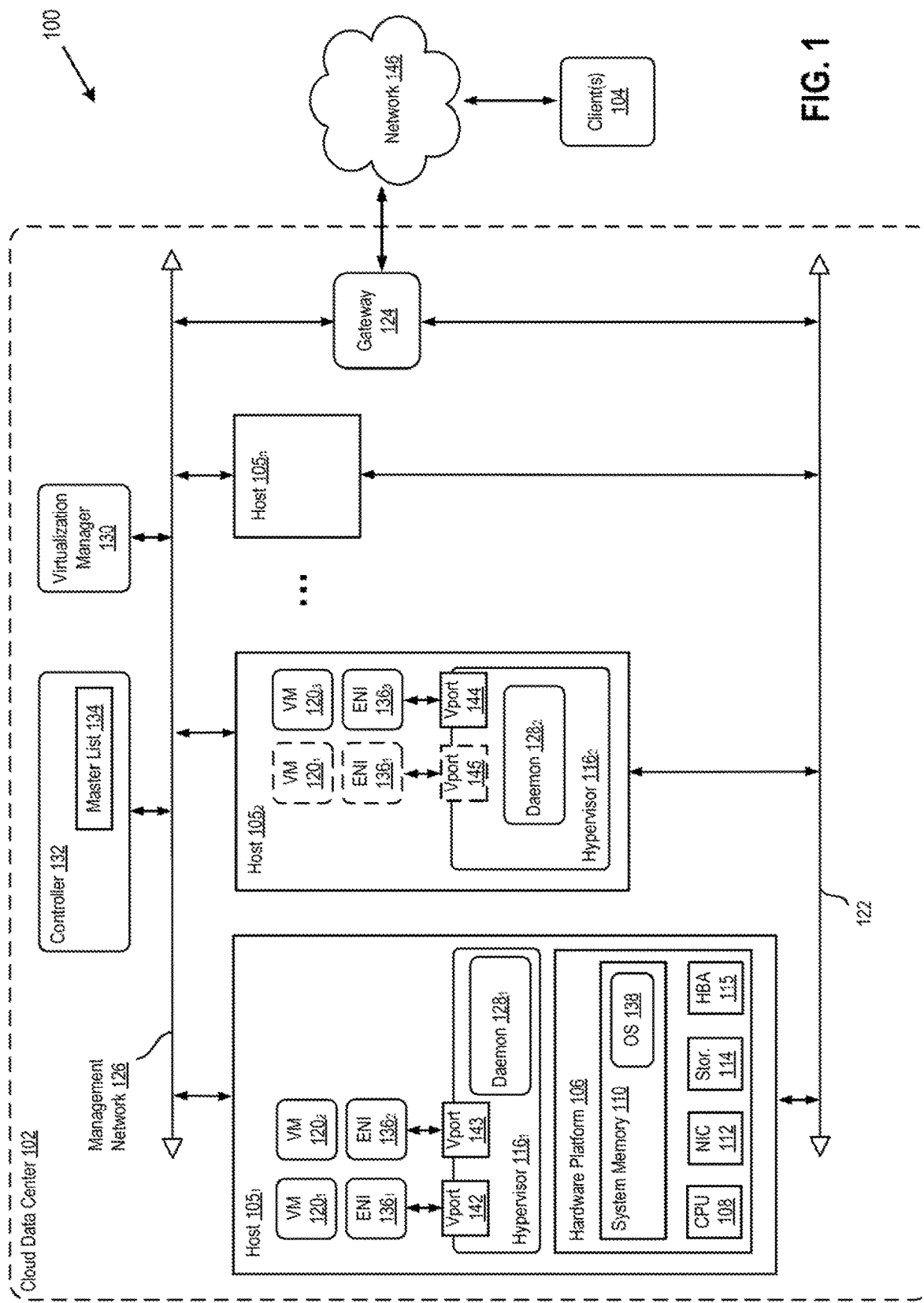
FIG. 1 depicts a block diagram of a computer system in which one or more embodiments of the present disclosure may be utilized.

FIG. 1 depicts a block diagram of a computer system 100 in which one or more embodiments of the present disclosure may be utilized. Computer system 100 includes cloud data center 102 connected to one or more client(s) 104 by a network 146. Client 104 may be within its own data center (not shown) or may be a standalone device, such as a desktop or a mobile computer. In an embodiment, client 104 issues commands to cloud data center 102 through virtualization manager 130, and virtualization manager then translates the commands to an application programming interface (API) of controller 132, and issues the commands to controller 132 using the API. In another embodiment, client 104 issues commands to cloud data center 102 by directly communicating with controller 132, bypassing virtualization manager 130. Network 146 may be, for example, a direct link, a local area network (LAN), a wide area network (WAN) such as the Internet, another type of network, or a combination of these.

Cloud data center 102 may be a private cloud that serves a single tenant, a public cloud that serves multiple tenants, or a hybrid cloud. As used herein, an internal cloud or "private" cloud is a cloud in which a tenant and a cloud service provider are part of the same organization, while an external or "public" cloud is a cloud that is provided by an organization that is separate from a tenant that accesses the external cloud. A hybrid cloud is a cloud architecture in which a tenant is provided with seamless access to both private cloud resources and public cloud resources. In an embodiment, cloud data center 102 may be running on Amazon Elastic Compute Cloud (EC2) of Amazon Web Services (AWS) cloud computing infrastructure, provided by Amazon.com, Inc.

Cloud data center 102 includes host(s) 105, a virtualization manager 130, a controller 132, a gateway 124, a management network 126, and a data network 122. Each of hosts 105 may be constructed on a server grade hardware platform 106, such as an x86 architecture platform. For example, hosts 105 may be geographically co-located servers on the same rack. Each host 105 shown in FIG. 1 may be substantially the same, containing substantially the same components. Hosts $105_2$ and $105_n$ are simplified depictions of a host 105, but may contain the same or similar components at host $105_1$. Host $105_2$ is shown as containing VM $120_1$ and ENI $136_1$, with VM $120_1$ and ENI $136_1$ depicted in dashed lines. The dashed lines indicate that VM $120_1$ and ENI $136_1$ are in the process of being migrated from host $105_1$ to host $105_2$, as further discussed with reference to FIG. 2, below.

Host 105 is configured to provide a virtualization layer, also referred to as a hypervisor 116, that abstracts processor, memory, storage, and networking resources of hardware platform 106 into multiple VMs 120. VMs on the same host 105 may run concurrently. Each of VMs 120 connect to hypervisor 116 through virtual ports (vports) 142-144. Each of vports 142-144 provides connectivity between VM 120 and hypervisor 116. A vport may be created within hypervisor 116 for VM 120 when VM 120 is first created on host 105 or when VM 120 is first migrated to a host 105 from another host 105. Upon creation or instantiation of VM 120, that VM 120 is associated with a designated per-VM ENI 136, such as by controller 132. That is, each ENI 136 may be a per-VM vNIC for a single VM 120, and not for a plurality of VMs 120. In an embodiment, VM 120 and its designated per-VM ENI 136 have the same IP address. For example, ENI $136_1$ may be associated with VM $120_1$ and only VM $120_1$, such that all or substantially all packets leaving VM $120_1$ or sent to VM $120_1$ pass through ENI $136_1$. In this example, VM $120_1$ and ENI $136_1$ have the same IP address.

Hypervisor 116 may run on top of operating system (OS) 138 in host 105 or directly on hardware platform 106 of host 105. One example of a hypervisor 116 that may be used is a VMware ESXi™ hypervisor provided as part of the VMware vSphere® solution made commercially available from VMware, Inc. of Palo Alto, Calif.

Hypervisor 116 includes daemon 128. Daemon 128 is a software module that monitors port-connect events. A port-connect occurs when VM 120 connects to a port of hypervisor 116, such as when VM $120_1$ connects to vport 142. Port-connect events are kernel-level events. Daemon 128 plugs into the code path of port-connects and listens for the occurrence of port-connect events. Upon the occurrence of a port-connect, daemon 128 extracts the IP address of VM 120 of the port-connect between that VM 120 and hypervisor 116. If the VM 120 does not have an associated ENI 136, then daemon 128 obtains or creates an ENI 136 to associate with VM 120. Daemon 128 sends to controller 132 the IP address of the VM 120, along with an identifier of ENI 136 associated or to be associated with that VM 120. Upon receiving the ENI and VM information, controller 132 updates master list 134 so as to create or update an association between VM 120 and its per-VM ENI 136. Optionally, controller 132 then transmits its updated master list 134, or relevant portions thereof, to some or all components of data center 136, such as ENIs 136 and/or hosts 105 of cloud data center 102, so that packets can be properly addressed to VM 120.

Host 105 includes one or more ENIs 136. ENI 136 is a software-based virtual network interface similar to a virtual NIC. ENI 136 has an IP address that is the same as VM 120 with which that ENI 136 is associated. ENI 136 may be a virtual appliance, a software module running within system memory 110, or a component of hypervisor 116. Although not shown, data center 102 may contain ENIs that are not associated with VMs, but rather with hosts 105 or with communication layers, such as one or more ENIs for communication via management network 126, one or more ENIs for communication via data network 122, and/or one or more ENIs for communication with a virtual storage area network (vSAN) (not shown).

ENI 136 includes security functionality that filters incoming and outgoing VM packets. ENI 136 may include security functionality that filters packets in and out of the host computer. For example, in addition to an ENI's "primary" IP address, ENI 136 may have a list of "secondary" IP addresses associated with the ENI. The "primary" IP address of an ENI is the address used for addressing packets to that ENI and for security filtering of packing passing through that ENI. The "secondary" IP addresses associated with ENI 136 are addresses used for security filtering of packets passing through that ENI and not for addressing packets destined for that ENI 136 or for VM 120 associated with that ENI 136. The list of secondary IP addresses may function as a "whitelist" of addresses for ENI 136, and the whitelist may include IP addresses of VMs 120 that may send packets to VM 120 associated with ENI 136 owning that whitelist. FIG. 1 shows three VMs $120_1$, $120_2$, and $120_3$, and three ENIs $136_1$, $136_2$, and $136_3$. VM $120_1$ is associated with per-VM ENI $136_1$, VM $120_2$ is associated with per-VM ENI $136_2$, and VM $120_3$ is associated with per-VM ENI $136_3$.

In an embodiment, ENI $136_1$ does not directly block or allow passage of a packet, but acts in conjunction with another component of computer system 100, such as a switch (e.g., virtual switch within hypervisor 116) or NIC 112 to block or allow passage of a packet.

ENI 136 may check the source IP address of an outgoing packet from VM 120 associated with that ENI 136, for security purposes. An outgoing packet sent by a source VM (e.g., VM $120_1$) reaches associated source ENI 136 (e.g., ENI $136_1$), which acts as a virtual NIC. ENI $136_1$ then checks the source IP address, and if the source IP address (i.e., IP address of source VM $120_1$) is the same as the primary IP address of ENI 136, then ENI 136 allows the outgoing packet to leave source host 105 or allows the outgoing packet to reach another VM 120 on the same host 105. The packet is then transmitted or routed to the next hop on the path to the packet's destination IP. Otherwise, if the source IP address is not the same as the primary IP address of source ENI $136_1$, then source ENI $136_1$ blocks the outgoing packet from leaving source host 105 and blocks the outgoing packet from reaching other VMs 120 on the same host 105.

ENI 136 may check the destination IP address of an outgoing packet from VM 120 associated with that ENI 136, for security purposes. An outgoing packet sent by a source VM (e.g., VM $120_1$) reaches associated source ENI 136 (e.g., ENI $136_1$), which acts as a virtual NIC. ENI $136_1$ then checks the destination IP address, and if the source IP address (i.e., IP address of source VM $120_1$) is whitelisted as a secondary address on destination ENI 136 (e.g., ENI $136_2$), then source ENI $136_1$ allows the outgoing packet to pass through ENI $136_1$ so as to reach destination VM $120_2$. Otherwise, if the source IP address is not whitelisted as a secondary address on destination ENI $136_2$, then source ENI $136_1$ blocks the outgoing packet. In this embodiment, ENI $136_1$ knows the whitelists of other ENIs 136, or ENI $136_1$ can access whitelists of other ENIs 136 by querying other ENIs 136 or by querying controller 132.

ENI 136 may check the destination IP address of an incoming packet, for security purposes. A packet's destination IP address may be checked by destination ENI $136_2$ when the packet reaches destination ENI $136_2$. In cloud data center 102, each packet that reaches physical NIC 112 of one of hosts 105 is transmitted to ENI 136 that has the destination IP address. ENI $136_2$ compares the packet's destination IP address to the whitelist (list of secondary IP addresses) of ENI $136_2$, and if the destination IP address is not on the whitelist, then then packet is blocked. Otherwise, the packets is transmitted to destination VM $120_2$ that has the same IP address as ENI $136_2$ and is associated with ENI $136_2$.

In an embodiment, network packets flowing through cloud data center 102 pass through controller 132 and controller 132 checks each packet's source IP address, destination IP address, or both, for security purposes. Controller 132 may compare the packet's source IP address to the whitelist of destination ENI $136_2$, to ensure that the packet's source IP address is listed as a secondary IP address of destination ENI $136_2$, and to ensure that destination VM $120_2$ is allowed to receive packets from source IP address (i.e., source VM $120_1$). Controller 132 may compare the packet's destination IP address to the whitelist of destination ENI $136_2$ to ensure that the packet's destination IP address is listed on destination ENI's whitelist as a secondary IP address.

Hardware platform 106 of each host 105 may include components of a computing device such as one or more processors (CPUs) 108, system memory 110, a network interface 112, storage system 114, a local host bus adapter (HBA) 115, and other I/O devices such as, for example, a mouse and keyboard (not shown). CPU 108 is configured to execute instructions, for example, executable instructions that perform one or more operations described herein and that may be stored in memory 110 and in storage 114. Network interface 112 enables host 105 to communicate with other devices via a communication medium, such as network 122 or network 126. Network interface 112 may include one or more network adapters, also referred to as Network Interface Cards (NICs). Network interface 112 may also be referred to as an elastic network adapter (ENA) in the cloud data center context. Storage system 114 represents local persistent storage devices (e.g., one or more hard disks, flash memory modules, solid state disks, and/or optical disks). Host bus adapter (HBA) couples host 105 to one or more external storages (not shown), such as a storage area network (SAN). Other external storages that may be used include network-attached storage (NAS) and other network data storage systems, which may be accessible via NIC 112.

System memory 110 includes OS 138, which is the operating system of host 105. System memory 110 is hardware allowing information, such as executable instructions, configurations, and other data, to be stored and retrieved. Memory 110 is where programs and data are kept when CPU 108 is actively using them. Memory 110 may be volatile memory or non-volatile memory. Volatile or non-persistent memory is memory that needs constant power in order to prevent data from being erased. Volatile memory describes conventional memory, such as dynamic random access memory (DRAM). Non-volatile memory is memory that is persistent (non-volatile). Non-volatile memory is memory that retains its data after having power cycled (turned off and then back on). Non-volatile memory is byte-addressable, random access non-volatile memory.

Virtualization manager 130 communicates with controller 132 and with client 104 via management network 126. Virtualization manager 130 issues commands to controller 132 using an API of controller 132. In an embodiment, virtualization manager 130 is optional and controller 132 performs the functionality of virtualization manager 130. Virtualization manager may be a tenant-specific software for managing virtual machines, and virtualization manager 130 uses software native to public cloud data center 102 (i.e., controller 132) to manage cloud data center 102.

Virtualization manager 130 communicates with hosts 105 via a network, shown as a management network 126, and carries out administrative tasks for data center 102 such as communicating with controller 132 for managing hosts 105, managing local VMs 120 running within host 105, provisioning VMs, migrating VMs from one host to another host, and load balancing between hosts 105. Virtualization manager 130 may be a computer program that resides and executes in a central server in cloud data center 102 or, alternatively, virtualization manager 130 may run as a virtual appliance (e.g., a VM) in one of hosts 105. One example of a virtualization manager 130 is the vCenter Server™ product made available from VMware, Inc.

Controller 132 communicates with hosts 105 via a network, shown as a management network 126, and carries out commands issued by virtualization manager 130. In an embodiment in which no virtualization manager is present, controller 132 may perform tasks substantially similar to virtualization manager 130. As described above, controller 132 receives from daemon 128 updates of ENI-VM associations. Upon receiving identifier of ENI 136 and identifier or IP address of VM 120, controller 132 updates master list 134 with the new association between ENI 136 and VM 120. Controller 132 also updates whitelists of ENIs 136, the whitelists being determined by virtualization manager 130 and/or an administrator of data center 102. Optionally, controller 132 transmits its updated master list 134, or portions thereof, to some or all components of cloud data center 102, such as to virtual switches, routers, hosts 105, or ENIs 136. Controller 132 may be a virtual appliance, a physical device, or a software module running within host 105. Controller 132 may be a virtual appliance such as one of VMs 120 or a distributed service running on one or more virtual appliances. One example of a controller 132 is the Amazon® Elastic Compute Cloud (EC2™) product made available from Amazon.com, Inc.

Gateway 124 provides VMs 120 and other components in data center 102 with connectivity to network 146. Gateway 124 may manage external public IP addresses for VMs 120 and route traffic incoming to and outgoing from cloud data center 102 and provide networking services, such as firewalls, network address translation (NAT), dynamic host configuration protocol (DHCP), and load balancing. Gateway 124 may use data network 122 to transmit data network packets to hosts 105. Gateway 124 may be a virtual appliance, a physical device, or a software module running within host 105. Gateway 124 may include two gateways: a management gateway for management network 126 and a data gateway for data network 122.

Figure 2:
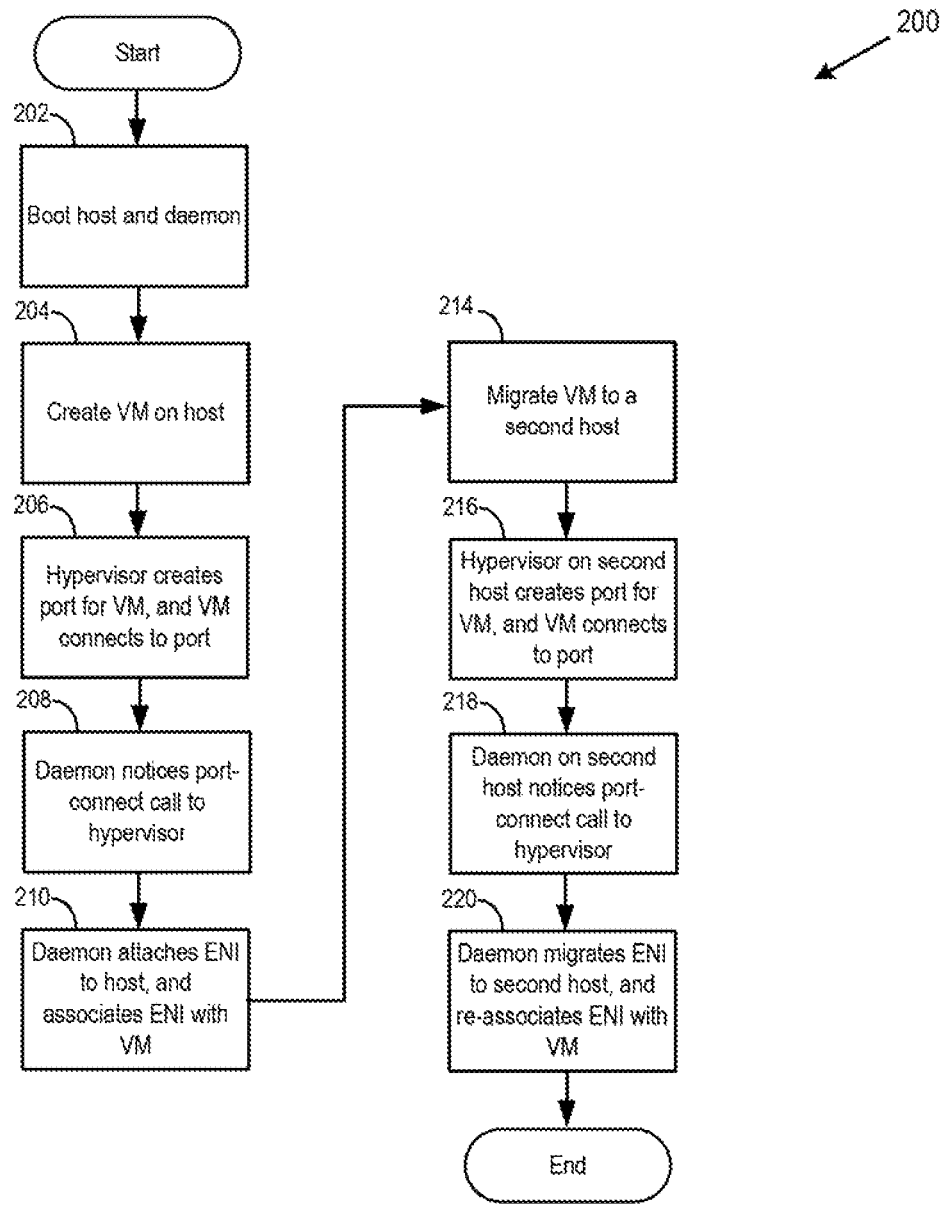
FIG. 2 depicts a flow diagram of a method of creating and migrating a VM from one host to another host, according to an embodiment.

FIG. 2 depicts a flow diagram of a method of creating and migrating a VM from one host to another host, according to an embodiment. In describing method 200, migration of VM $120_1$ from host $105_1$ to host $105_2$ will be used for illustration purposes. However, the same principles may apply to migration of any VM 120 in cloud data center 102.

At step 202, host $105_1$ is booted up, which also boots hypervisor $116_1$ and daemon $128_1$. Host $105_1$ may be booted up as part of creating and/or booting data center 102. For example, data center 102 may be a software defined data center (SDDC). Client 104 may request provider of data center 102 to create, for example, a three-node data center. Provider of data center 102 may then request allocation of three hosts 105 from the cloud infrastructure of a cloud provider. The cloud provider and provider of data center 102 may be the same entity or may be different entities. The three allocated hosts are, for example, hosts $105_1$, $105_2$, and $105_0$, as shown in FIG. 1. After allocation and deployment of hosts 105, provider of data center 102 configures data center 102 for client 104, such as for example, configuring subnets, connecting the subnets together, attaching subnets to hosts 105, deploying hypervisor 116 on each allocated host 105, starting up daemon 128 on each allocated host 105, creating a pool of per-VM ENIs, creating ENIs such as a vSAN ENI, a management network ENI, an ENI for migrating VMs between hosts, etc. The resulting data center then becomes data center 102 available for use by client 104.

As stated, as part of creating and configuring data center 102, a pool of ENIs 136 may be pre-created for later association to VMs 120. Each ENI 136 in the pool may be identified by an identifier, and each ENI 136 may be assigned an IP addresses from a pool of available IP addresses. If an IP address is assigned to each ENI 136 in the pool, then when a VM 120 is created, an ENI with a matching IP address may be located within the pool and assigned to that newly created VM $120_1$.

At step 204, VM $120_1$ is created or instantiated on host $105_1$. VM $120_1$ may be created by a command issued by client 104 to virtualization manager 130, that command being translated into API of controller 132 and forwarded to controller 132. VM $120_1$ may be created by a direct command from client 104 to controller 132. VM $120_1$ may also be created automatically upon satisfaction of certain conditions, those conditions being evaluated by controller 132, virtualization manager 130, or another module. As part of creating or instantiating VM $120_1$, virtualization manager 130 or controller 132 assigns the newly created VM $120_1$ an IP address, such as from a pool of available IP addresses.

At step 206, hypervisor $116_1$ creates a new virtual port 142 for the newly created VM $120_1$. As part of step 206, VM $120_1$ connects to hypervisor $116_1$ through vport 142.

At step 208, daemon $128_1$ detects the port-connect event of step 206 between hypervisor vport 142 and VM $120_1$. Daemon $128_1$ extracts the IP address of VM $120_1$. Daemon $128_1$ then either locates ENI $136_1$ having the same IP address within a pool of pre-created ENIs, or daemon $128_1$ creates ENI $136_1$ and assigns to the newly created ENI $136_1$ the same IP address as that of VM $120_1$.

At step 210, daemon $128_1$ attaches the ENI $136_1$ identified or created at step 208 to host $105_1$ on which VM $120_1$ is running. Attachment of ENI $136_1$ to host $105_1$ may be performed by, for example, an ATTACH command of the Attach Network Interface API. After attachment to host $105_1$, daemon $128_1$ associates VM $120_1$ with ENI $136_1$, such by (a) associating vport 142 with ENI $136_1$, and (b) sending IP address of VM $120_1$ and the identifier of ENI $136_1$ to controller 132. After the association, packets sent to VM $120_1$ always flow through ENI $136_1$ before reaching VM $120_1$, and packets sent from VM $120_1$ always flow through ENI $136_1$ before being transmitted to the packet's destination address.

At step 214, VM $120_1$ is migrated from host $105_1$ to host $105_2$. The migration process is depicted in FIG. 1 by the dashed lines around VM $120_1$ within host $105_2$. The migration process may be prompted by a command issued by client 104 to virtualization manager 130, that command being translated into API of controller 132 and forwarded to controller 132. Migration of VM $120_1$ may be initiated by a direct command from client 104 to controller 132. Migration of VM $120_1$ may also be initiated automatically upon satisfaction of certain conditions, those conditions being evaluated by controller 132, virtualization manager 130, or another module. VM $120_1$ may be migrated by VM migration methods known in the art, such as the method described in U.S. patent application Ser. No. 13/760,868, filed Feb. 6, 2013, or the method described in U.S. Pat. No. 9,870,324, issued Jan. 16, 2018. The entire contents of both of these documents are incorporated by reference herein.

After completion of migration of VM $120_1$, hypervisor $116_1$ may unreserve memory of VM $120_1$ on host $105_1$, may disconnect VM $120_1$ from vport 142, and may delete or unreserve vport 142.

At step 216, hypervisor $116_1$ creates a new virtual port 145 for the newly migrated VM $120_1$. As part of step 216, VM $120_1$ connects to hypervisor $116_1$ through vport 145. After migration to host $105_2$, VM $120_1$ retains the same IP address as on host $105_1$.

At step 218, daemon $128_2$ detects the port-connect event of step 216 between hypervisor vport 145 and VM $120_1$. Daemon $128_2$ extracts the IP address of VM $120_1$. Daemon $128_2$ then locates ENI $136_1$ having the same IP address, such as by iterating through existing ENIs 136 on data center 102.

At step 220, daemon $128_2$ migrates ENI $136_1$ from host $105_1$ to host $105_2$. The migration may be performed by detaching ENI $136_1$ from host $105_1$ and attaching ENI $136_1$ to host $105_2$. Daemon $128_2$ detaches ENI $136_1$ located at step 218 from host $105_1$ by, for example, a DETACH command of the Attach Network Interface API. Daemon $128_2$ attaches ENI $136_1$ located to host $105_2$ by, for example, an ATTACH command of the Attach Network Interface API. After migration of ENI $136_1$ to host $105_2$, ENI $136_1$ retains the same primary IP address and the same secondary IP addresses as on host $105_1$. While on host $105_2$, ENI $136_1$ has the same primary IP address as the IP address of VM $120_1$.

After attachment to host $105_2$, daemon $128_2$ associates VM $120_1$ with ENI $136_1$, such by associating vport 145 with ENI $136_1$. After the association, packets sent to VM $120_1$ continue to always flow through ENI $136_1$ before reaching VM $120_1$, and packets sent from VM $120_1$ continue to always flow through ENI $136_1$ before being transmitted to the packet's destination address. After completion of step 220, method 200 ends.

It should be understood that, for any process described herein, there may be additional or fewer steps performed in similar or alternative orders, or in parallel, within the scope of the various embodiments, consistent with the teachings herein, unless otherwise stated.

The various embodiments described herein may employ various computer-implemented operations involving data stored in computer systems. For example, these operations may require physical manipulation of physical quantities-usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system-computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Virtualization systems in accordance with the various embodiments may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Certain embodiments as described above involve a hardware abstraction layer on top of a host computer. The hardware abstraction layer allows multiple contexts to share the hardware resource. In one embodiment, these contexts are isolated from each other, each having at least a user application running therein. The hardware abstraction layer thus provides benefits of resource isolation and allocation among the contexts. In the foregoing embodiments, virtual machines are used as an example for the contexts and hypervisors as an example for the hardware abstraction layer. As described above, each virtual machine includes a guest operating system in which at least one application runs. It should be noted that these embodiments may also apply to other examples of contexts, such as containers not including a guest operating system, referred to herein as "OS-less containers" (see, e.g., www.docker.com). OS-less containers implement operating system-level virtualization, wherein an abstraction layer is provided on top of the kernel of an operating system on a host computer. The abstraction layer supports multiple OS-less containers each including an application and its dependencies. Each OS-less container runs as an isolated process in userspace on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using OS-less containers, resources can be isolated, services restricted, and processes provisioned to have a private view of the operating system with their own process ID space, file system structure, and network interfaces. Multiple containers can share the same kernel, but each container can be constrained to only use a defined amount of resources such as CPU, memory and I/O. The term "virtualized computing instance" as used herein is meant to encompass both VMs and OS-less containers.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

We claim:

1. A method of dynamically reprogramming network infrastructure of a data center, the method comprising:
providing a virtual machine (VM) on a first host;
associating the VM with an elastic network interface (ENI) of the first host, wherein the ENI comprises a list;
receiving, by the ENI, a network packet;
comparing, by the ENI, an address of the packet to the list, wherein the address is an IP address; and
responsive to the comparing:
blocking the packet, if the address is not on the list;
transmitting the packet toward a destination address of the packet, if the destination address is on the list;
migrating the VM from the first host to a second host;
connecting the VM to a second hypervisor on the second host; and
migrating the ENI from the first host to the second host.

2. The method of claim 1, wherein the ENI has a first IP address and the VM has the first IP address.

3. The method of claim 2, wherein the ENI comprises a plurality of IP addresses, wherein a primary IP address of the plurality of IP addresses is an IP address used for addressing packets to the ENI, and wherein the primary IP address of the ENI is the first IP address.

4. The method of claim 1, wherein associating the VM with the ENI of the first host comprises connecting the VM to a first hypervisor of the first host through a virtual port of the first hypervisor, and associating the ENI with the virtual port of the first hypervisor.

5. The method of claim 4, wherein the associating the VM with the ENI of the first host is performed by a daemon within the first host, the daemon being configured to monitor port-connect events between virtual machines and the first hypervisor.

6. The method of claim 1, further comprising:
responsive to the connecting, extracting an identifier of the VM; and
locating the ENI within the data center based on the identifier of the VM.

7. The method of claim 1, wherein the data center is a software defined data center.

8. A non-transitory computer readable medium comprising instructions to be executed in a processor of a computer system, the instructions when executed in the processor cause the computer system to carry out a method of dynamically reprogramming network infrastructure of a data center, the method comprising:
providing a virtual machine (VM) on a first host;
associating the VM with an elastic network interface (ENI) of the first host, wherein the ENI comprises a list;
receiving, by the ENI, a network packet;
comparing, by the ENI, an address of the packet to the list, wherein the address is an IP address; and
responsive to the comparing:
blocking the packet, if the address is not on the list;
transmitting the packet toward a destination address of the packet, if the destination address is on the list;
migrating the VM from the first host to a second host;
connecting the VM to a second hypervisor on the second host; and
migrating the ENI from the first host to the second host.

9. The non-transitory computer readable medium of claim 8, wherein the ENI has a first IP address and the VM has the first IP address.

10. The non-transitory computer readable medium of claim 9, wherein the ENI comprises a plurality of IP addresses, wherein a primary IP address of the plurality of IP addresses is an IP address used for addressing packets to the ENI, and wherein the primary IP address of the ENI is the first IP address.

11. The non-transitory computer readable medium of claim 8, wherein associating the VM with the ENI of the first host comprises connecting the VM to a first hypervisor of the first host through a virtual port of the first hypervisor, and associating the ENI with the virtual port of the first hypervisor.

12. The non-transitory computer readable medium of claim 11, wherein the associating the VM with the ENI of the first host is performed by a daemon within the first host, the daemon being configured to monitor port-connect events between virtual machines and the first hypervisor.

13. The non-transitory computer readable medium of claim 8, the method further comprising:
responsive to the connecting, extracting an identifier of the VM; and
locating the ENI within the data center based on the identifier of the VM.

14. The non-transitory computer readable medium of claim 8, wherein the data center is a software defined data center.

15. A computer system comprising:
a data center;
a first host comprising a virtual machine (VM) and an elastic network interface (ENI);
a second host comprising a second hypervisor; and
a processor, wherein the processor is programmed to carry out a method of dynamically reprogramming network infrastructure of a data center, the method comprising:
providing a virtual machine (VM) on a first host;
associating the VM with an elastic network interface (ENI) of the first host, wherein the ENI comprises a list;
receiving, by the ENI, a network packet;
comparing, by the ENI, an address of the packet to the list, wherein the address is an IP address; and
responsive to the comparing:
blocking the packet, if the address is not on the list;
transmitting the packet toward a destination address of the packet, if the destination address is on the list;
migrating the VM from the first host to a second host;
connecting the VM to a second hypervisor on the second host; and
migrating the ENI from the first host to the second host.

16. The computer system of claim 15, wherein the ENI has a first IP address and the VM has the first IP address.

17. The computer system of claim 16, wherein the ENI comprises a plurality of IP addresses, wherein a primary IP address of the plurality of IP addresses is an IP address used for addressing packets to the ENI, and wherein the primary IP address of the ENI is the first IP address.

18. The computer system of claim 15, wherein associating the VM with the ENI of the first host comprises connecting the VM to a first hypervisor of the first host through a virtual port of the first hypervisor, and associating the ENI with the virtual port of the first hypervisor.

* * * * *